Aug. 25, 1964     R. F. STOLL     3,145,499

FISHING LINE AND FLOAT CONNECTOR

Filed Feb. 5, 1962

INVENTOR.
ROBERT F. STOLL
BY
ATTORNEY

United States Patent Office 3,145,499
Patented Aug. 25, 1964

3,145,499
FISHING LINE AND FLOAT CONNECTOR
Robert F. Stoll, 2115 14th St. Road, Greeley, Colo.
Filed Feb. 5, 1962, Ser. No. 171,082
2 Claims. (Cl. 43—44.91)

This invention relates to the art and practice of angling, and more particularly to that technique of angling characterized by use of a hooked line, rod, reel, and float, and has as an object to provide novel and improved means for connecting a float to a fishing line.

A further object of the invention is to provide a novel and improved fishing line and float connector that functions as a swivel mount for a float in use association with a line.

A further object of the invention is to provide a novel and improved fishing line and float connector that is adjustably attachable to and as a swivel mount for a float on a line without occasion for cutting, knotting, or other impairment of the line.

A further object of the invention is to provide a novel and improved fishing line and float connector that is effective in use to relieve the line-mounted float from the influence of twisting forces manifest in the line.

A further object of the invention is to provide a novel and improved fishing line and float connector that is effective in use to minimize kinking and snarling of the associated line.

A further object of the invention is to provide a novel and improved construction and operative correlation of elements constituting a connector attachable to a fishing line as a swivel mount for a float thereby associated with the line.

A further object of the invention is to provide a novel and improved fishing line and float connector that is simple and economical of production in a diversity of appropriate sizes and specific structural embodiments, that is interchangeably coactable with floats of varying form, style, and construction, that is convenient of attachment to, adjustment along, and removal from a fishing line, and that is positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawing, in which—

It is ancient practice in the art of angling with a hooked line, rod, and reel to attach to the line inwardly thereof from the hook a float adapted by virtue of its buoyancy to ride on the surface of water and there function as a "bobber" to give visual indication of fish action affecting the submerged hook. Attachment of the float to and at the desired point along the fishing line is commonly done by means of knots, or a knotted loop, formed in the line with consequent weakening of the line where it bends abruptly into the knot, difficulty incident to releasing the knot, or knots, for relocation or removal of the float with respect to the line, and a fixed angular relation of float and line that requires simultaneous rotation of both for relief of torsions affecting the line. The advent of spinning-type reels for the manipulation of fishing lines with consequent twisting of and generation of torsions in the line has promoted kinking and snarling of a line carrying a float in fixed angular relation therewith and has emphasized the desirability of a swivel connection of the float to the line effective to accommodate free relative rotation of the line, and while swivels applicable to such purpose have long been available they customarily require insertion in a cut portion of the line, or confinement between knots in the line, resulting in impairment of the original line and an attachment of the float infeasible of adjustment along the line. The occasion for means engageable with and adjustable along an unimpaired fishing line as a swivel mount for an associated float being established, the instant invention is hence directed to the provision of novel and improved such means characterized by advantageous practicality.

Figure 1:
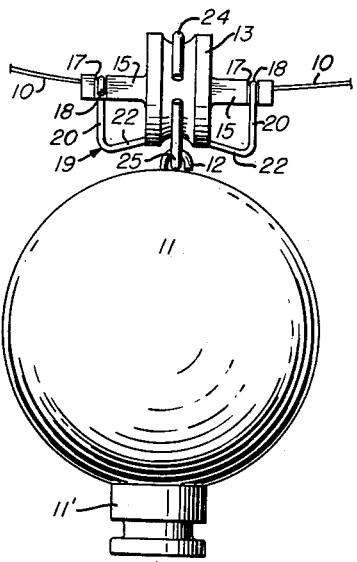
FIGURE 1 is a side elevational view, on a somewhat enlarged scale, of a typical embodiment of the invention as applied in position of practical use to interconnect a fishing line and float.
Figure 2:
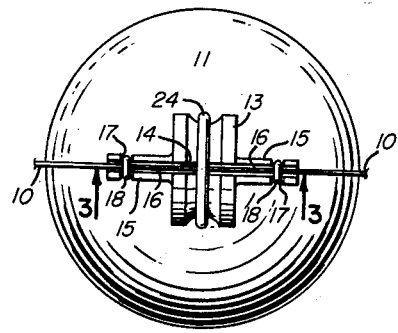
FIGURE 2 is a top plan view of the organization according to FIGURE 1.
Figure 3:
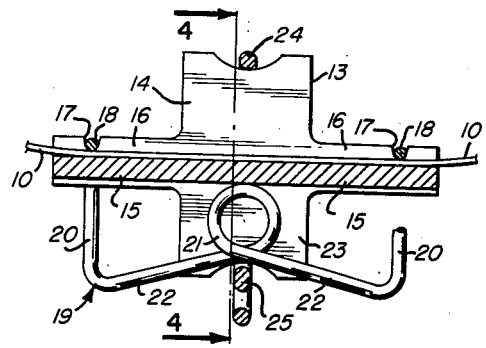
FIGURE 3 is a section, on a further enlarged scale, taken longitudinally through the connector represented by the preceding view substantially on the indicated line 3—3 of FIGURE 2 with the float feature of the latter omitted.

In the views of the drawing, the numeral 10 designates a length of uninterrupted, unknotted, conventional fishing line and the numeral 11 designates a conventional float of any appropriate style, form, and construction furnished, as is usual, with an attaching eye 12; it being understood that when used as intended in attachment to the line 10 the float 11 is inverted from the position according to FIGURE 1 to ride on a water surface with its signal boss 11' uppermost in support of the hooked terminal portion of the line submerged in dependence therefrom.

The connector of the invention is a unitary organization distinguished by an integral fitting formed from suitably rigid, light-weight material, such as synthetic resin, magnesium, aluminum, or the like, to provide a peripherally-grooved, cylindrical body 13 which is intersected by a longitudinal slot 14 intruding radially thereof to the axial center of the body in a size of opening freely accommodating the line 10, and means coaxial with said body 13 wherethrough the latter may be adjustably and detachably retained on a portion of the line 10 received in and traversing said slot. Susceptible of structural variation and modification within the contemplation of the invention, the means effective to retain the body 13 in attachment to the line portion 10 is represented as a pair of like hubs 15 integral with and extending in complementary relation axially and oppositely from the body 13 to overlap the inner end of the slot 14 which is continued longitudinally of said hubs by means of grooves 16 opening laterally and through the outer ends of the hubs in end registration with said slot, whereby to provide a straight channel for the accommodation of a length portion of the line 10 fully traversing and opening to the center of the fitting comprised from the body 13 and hubs 15. Inwardly adjacent their outer ends, the hubs 15 are correspondingly formed with transverse notches 17 intersecting the grooves 16 in a like direction of opening laterally of the hub for individual reception of a hook 18 thereby positioned to span across the base of the associated groove 16 and the portion of the line 10 received therein. The hooks 18 are yieldably urged to and optionally separable from normal seated engagement within their respective notches 17 in any feasible manner and by any expedient means, a simple and practical arrangement effective for such purpose comprising, as illustrated, a yoke 19 of spring wire having spaced, generally-parallel side arms 20 carrying the hooks 18 as terminals, an expansive loop 21 formed centrally between said arms in the yoke base as a resilient component continuous with and intercoupling divergent, oppositely-directed segments 22 of the yoke base interlinking the arms 20, and a recess 23 radial of the body 13 in opposition to and out of communication with the slot 14 adapted to loosely house said loop 21. Tensioned and proportioned for realization of its purpose, the yoke 19 functions with its loop 21 seated in the recess 23, as shown, to resiliently urge the hooks 18 inwardly of their respective notches 17 over and with clamping effect upon a portion of the line 10 traversing the slot 14 and grooves 16 thereunder and to yield to manually-applied pressure with retraction of said hooks for release of the line portion and to clearing relation with the notches 17, whereby to accommodate and to facilitate adjustable attachment of the fitting characterized by the body 13 to a line 10 without impairment thereof in a manner convenient of optional release for adjustment of the fitting along or removal of the fitting from the associated line.

Figure 4:
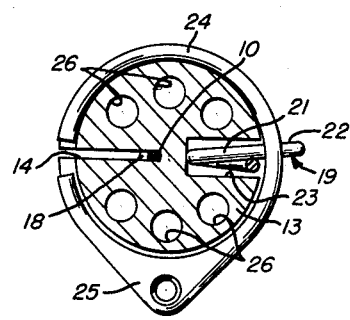
FIGURE 4 is a transverse section through the connector taken substantially on the indicated line 4—4 of FIGURE 3.

The connector distinguished by the fitting hereinbefore described is completed for intended use as a swivel mount for a float by the provision of a stiff, interrupted annulus 24 loosely engaged for retention within and revolubly embracing the peripheral groove of the body 13, which annulus is formed or furnished with an apertured radial enlargement 25, or the equivalent, wherewith the attaching eye 12 of a float is connectible in any expedient usual manner to couple the float in use association with the annulus. Attached, as shown and described, to the annulus 24 retained upon and freely revoluble about the body 13 of the fitting, the float 11 is swivelled to a mount detachably and adjustably connectible with an unimpaired and uninterrupted length of fishing line for unimpeded rotational displacement relative to the fitting and associated line, whereby twists and torsions manifest in the line are afforded relief without reaction upon or restraint by the float, the interruption in the annulus 24, susceptible of registration with the slot 14 as represented by FIGURE 4, qualifying the completed connector for attachment to, adjustment along, and removal from an associated fishing line by the means and in the manner above set forth. As indicated by the showing of FIGURE 4, weight of the connector may be reduced in consequence of holes 26 in and through the body 13.

Operation and practical use of the improved connector are fully elaborated in the foregoing description.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A connector for separably coupling a float having an attaching eye to a fishing line comprising a fitting formed with a laterally-opening channel extending the full length and intruding to the center of the fitting adapted to receive and seat a smooth, uninterrupted length of fishing line centrally of and in longitudinally-reciprocable relation through the fitting, a peripherally-grooved, cylindrical body fixedly concentric with said fitting formed with spacedly-parallel circular sides and a radial slot registered in communication with the channel of the fitting, an interrupted annulus loosely and revolubly embracing and retained on said body in coaction with the peripheral groove thereof, the interruption of said annulus being registrable with the slot of the body to provide passage to and from the fitting for the uninterrupted length of fishing line whereto the float is to be coupled, means on said annulus operatively connectible with the attaching eye of a float, and means carried by the fitting selectively actuable to detachably interclamp the fitting and a length of line centrally therethrough at both sides of said body, wherein said fitting extends at each side of said body in the form of like, longitudinally-channeled hubs coaxial with the body having each a transverse notch intersecting the hub channel and correspondingly opening laterally of the hub, and the means for interclamping the fitting and an associated length of line is a hook resiliently biased in a mounting on the fitting to seat in the transverse notch of each hub over and against the line segment traversing the intersection of the hub channel and notch.

2. A connector for separably coupling a float having an attaching eye to a fishing line comprising a fitting formed with a laterally-opening channel extending the full length and intruding to the center of the fitting adapted to receive and seat a smooth, uninterrupted length of fishing line centrally of and in longitudinally-reciprocable relation through the fitting, a peripherally-grooved, cylindrical body fixedly concentric with said fitting formed with spacedly-parallel circular sides and a radial slot registered in communication with the channel of the fitting, an interrupted annulus loosely and revolubly embracing and retained on said body in coaction with the peripheral groove thereof, the interruption of said annulus being registrable with the slot of the body to provide passage to and from the fitting for the uninterrupted length of fishing line whereto the float is to be coupled, means on said annulus operatively connectible with the attaching eye of a float, and means carried by the fitting selectively actuable to detachably interclamp the fitting and a length of line centrally therethrough at both sides of said body, wherein said fitting extends at each side of said body in the form of like, longitudinally-channeled hubs coaxial with the body having each a transverse notch intersecting the hub channel and correspondingly opening laterally of the hub, and the means for interclamping the fitting and an associated length of line is a hook adapted to seat in the transverse notch of each hub over and against the line segment traversing the intersection of the hub channel and notch, means resiliently intercoupling the hooks for the respective hubs in a like direction of bias, and a recess formed to open at the side of said body remote from its radial slot loosely accommodating said means resiliently intercoupling the hooks to oppose the bias thereof to the direction of hub channel and slot opening.

References Cited in the file of this patent

UNITED STATES PATENTS

| | | |
|---|---|---|
| 1,504,884 | Garst | Aug. 12, 1924 |
| 2,425,069 | Metzler | Aug. 5, 1947 |
| 2,545,326 | Westfall et al. | Mar. 13, 1951 |
| 2,662,328 | Oyler | Dec. 15, 1953 |